US010795610B2

(12) United States Patent
Steinmetz

(10) Patent No.: US 10,795,610 B2
(45) Date of Patent: Oct. 6, 2020

(54) READ LOOK AHEAD DATA SIZE DETERMINATION

(71) Applicant: Micron Technology, Inc., Boise, ID (US)

(72) Inventor: Cory M. Steinmetz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/993,007

(22) Filed: May 30, 2018

(65) Prior Publication Data

US 2019/0369912 A1 Dec. 5, 2019

(51) Int. Cl.
*G06F 3/06* (2006.01)
*G06F 12/10* (2016.01)

(52) U.S. Cl.
CPC ........... *G06F 3/0659* (2013.01); *G06F 3/068* (2013.01); *G06F 3/0611* (2013.01); *G06F 12/10* (2013.01); *G06F 2212/1024* (2013.01); *G06F 2212/657* (2013.01)

(58) Field of Classification Search
CPC ...... G06F 3/0659; G06F 3/0611; G06F 3/068; G06F 12/1024; G06F 2212/1024; G06F 2212/657
USPC ........................................................ 711/154
See application file for complete search history.

(56) References Cited

U.S. PATENT DOCUMENTS

| 8,732,406 B1 | 5/2014 | Pase et al. |
| 9,430,307 B2 | 8/2016 | Yang |
| 2005/0154825 A1* | 7/2005 | Fair ...................... G06F 3/0611 711/113 |
| 2009/0157964 A1* | 6/2009 | Kasorla ............... G06F 12/0246 711/118 |
| 2019/0129834 A1* | 5/2019 | Purkayastha ....... G06F 12/0246 |

OTHER PUBLICATIONS

Chen et al "An adaptive prefetching scheme for storage system in multi-application environment" [online] Published 2012 Digest APMRC Accessed from the Internet <URL: https://ieeexplore.ieee.org/document/6407521?source=IQplus> (Year: 2012).*

* cited by examiner

*Primary Examiner* — David Yi
*Assistant Examiner* — Dustin B. Fulford
(74) *Attorney, Agent, or Firm* — Lowenstein Sandler LLP

(57) ABSTRACT

A read request from a host system can be received. It can be detected that the read request is associated with a pattern of read requests. A requested transfer size associated with the read request can be identified. A size of data to retrieve can be determined. The size of the data can be based on the requested transfer size and a die-level transfer size associated with a die of a memory system.

20 Claims, 4 Drawing Sheets

READ LOOK AHEAD DATA SIZE DETERMINATION

TECHNICAL FIELD

Embodiments of the disclosure relate generally to memory systems, and more specifically, relate to determination of a read look ahead data size in memory systems.

BACKGROUND

A memory system can be a storage system, such as a solid-state drive (SSD), and can include one or more memory devices that store data. A memory system can include memory devices such as non-volatile memory devices and volatile memory devices. In general, a host system can utilize a memory system to store data at the memory devices of the memory system and to retrieve data from the memory devices of the memory system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
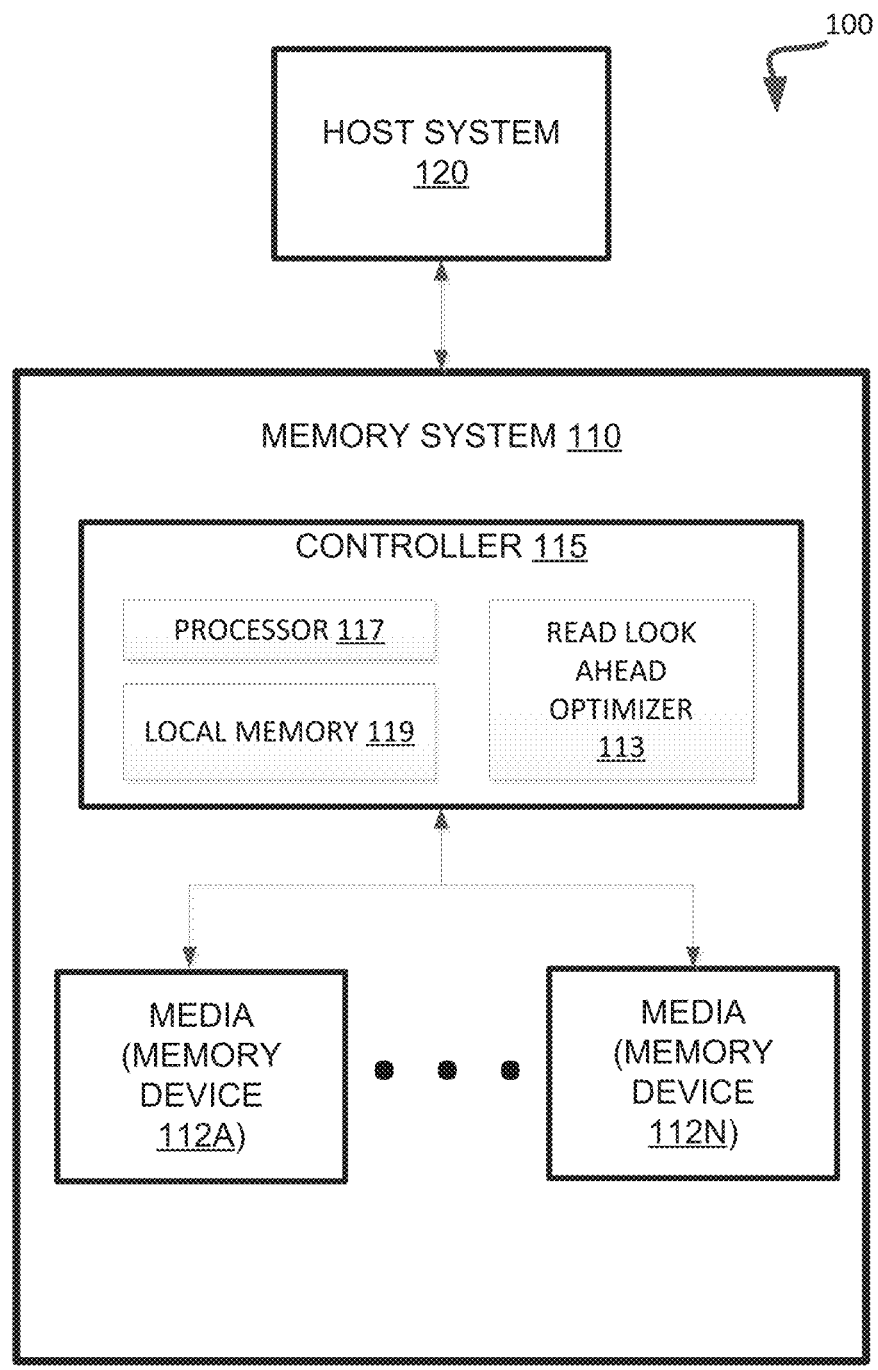
FIG. 1 illustrates an example computing environment that includes a memory system in accordance with some embodiments of the present disclosure.

Aspects of the present disclosure are directed to determination of a read look ahead data size. In general, a host system can utilize a memory system to store and retrieve data. The host system can provide data to be stored on the memory system or request to retrieve particular data from the memory system. The data can be stored and retrieved from the memory devices within the memory system. An example of a memory system is a solid-state drive (SSD) that includes memories (e.g., non-volatile memory, volatile memory, etc.). An example of a non-volatile memory can include a negative-and (NAND) type flash memory. An example of a volatile memory can include some random access memory (RAM) devices, although not all RAM devices are volatile memory. In addition, a type of RAM known as "cache memory" can be used to store data, providing faster access to data when requested. When the host system requests to retrieve data, it can be faster to retrieve the data from one type of memory over another type. For example, a cache memory can provide access to data faster than a NAND memory. A NAND memory can be organized in various sections. For example, a NAND memory can include one or more storage dies, which are individual units that can independently execute commands (e.g., read operations or write operations). Each die can include one or more planes, where identical and concurrent operations can take place on each plane. Each plane can have multiple blocks, which are the smallest units that can be erased. Each block can have multiple pages, which are the smallest units that can be written to.

It can be advantageous to be able to retrieve and store the requested data onto a type of memory device that is capable of providing fast access to the requested data. When it is possible to predict the data that the host system is likely to request in subsequent instructions (e.g., read operations), it can be even more advantageous to retrieve the predicted data onto the memory device before the data is requested by the host system. In conventional systems, a "read look ahead" technique is used when a prediction of an access pattern by a host system is detected. Read look ahead techniques involve proactively pre-fetching, or retrieving ahead of time, some additional data after determining that the subsequent command (e.g., a subsequent read operation) from the host system is likely to follow the detected pattern associated with the current command from the host system. Pre-fetching additional data prior to the host system requesting the additional data can remove latency because the host system can avoid waiting to fetch the additional data until after the additional data is requested. However, pre-fetching too much data in advance can lead to a waste of computing resources. Since the pre-fetching is dependent upon a prediction that the host system is likely to request the additional data in the detected pattern, it is possible that the prediction can be incorrect and the host system may not in fact request the additional data according to the pattern. In such a situation, the computing resources spent to retrieve any additional data that the host system does not actually end up requesting can be wasteful. Additionally, the memory system can be delayed in performing other read operations or write operations from the host system when retrieving additional data that will not be requested by the host system.

Moreover, in certain environments, performance optimization can be challenging depending upon the size of host system requests and whether parallelism can be achieved with the host system requests. Parallelism is achieved when data accesses can be performed independently in parallel. As a host system requests data for a particular set of logical block addresses (LBA), the LBAs are translated to physical addresses from where the data is to be retrieved. The physical addresses can be laid out across multiple die within a NAND device. If there is enough data to retrieve, then the data can be accessed from multiple dies as well as multiple planes within the multiple dies. Accessing multiple dies and multiple planes allows for parallelism. However, in a low queue depth (e.g., low input/output data volume) environment, sequential read workload does not allow for high parallelism because not enough data is to be retrieved that may be located on multiple planes or dies.

Aspects of the present disclosure address the above and other deficiencies by determining a size of read look ahead data that is an optimal size to speculatively pre-fetch, which can eliminate or reduce the wastage of computing resources. In one implementation, a the memory system receives a read request from a host system. The memory system can determine that the read request is associated with a pattern of read requests by the host system. For example, the pattern can be that the read request from the host system is associated with requests for a number of sequential logical blocks of data. The memory system can identify a requested transfer size associated with the read request. The requested transfer size can correspond to an amount of data to be retrieved and can be specified by the read request. For example, the read request can be in the size of 8 kB of data. The memory system can determine a size of data to retrieve in accordance with the pattern of read requests. The size of the data can be based on the identified transfer size of the read request and a transfer size associated with the die of a memory device from which to retrieve the data. For example, the size of the data can be based on the maximum value between the identified transfer size of the read request and a die-level transfer size associated with a die of the memory system. The die-level transfer size can correspond to another amount of data that is associated with the die and calculated based on an architecture of the die. A transfer size associated with the die can be computed based on the number of bytes on a page and the number of planes used by the die. Upon determining the size, the memory system can retrieve data in accordance with the read request and the pattern to retrieve an amount of data at the determined size.

Advantages of the present disclosure include, but are not limited to, the increased performance of the memory system as the read look ahead can be performed more efficiently and optimally, minimizing latency, and without wasting computing resources by retrieving too much additional data. The present disclosure provides for achieving parallelism when retrieving data for the host system by providing for an optimal amount of data to retrieve that can allow for retrieving the minimum amount of data sufficient for multi-plane operations. As a result of the determination of the read look ahead data size, data retrieval requests from the host system can be provided more efficiently, optimally, and with high performance.

FIG. 1 illustrates an example computing environment 100 that includes a memory system 110 in accordance with some implementations of the present disclosure. The memory system 110 can include media, such as memory devices 112A to 112N. The memory devices 112A to 112N can be volatile memory devices, non-volatile memory devices, or a combination of such. In some embodiments, the memory system is a storage system. An example of a storage system is a SSD. In general, the computing environment 100 can include a host system 120 that uses the memory system 110. In some implementations, the host system 120 can write data to the memory system 110 and read data from the memory system 110. In some embodiments, the memory system 110 is a hybrid memory/storage system.

The host system 120 can be a computing device such as a desktop computer, laptop computer, network server, mobile device, or such computing device that includes a memory and a processing device. The host system 120 can include or be coupled to the memory system 110 so that the host system 120 can read data from or write data to the memory system 110. The host system 120 can be coupled to the memory system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory system 110. The host system 120 can further utilize an NVM Express (NVMe) interface to access the memory devices 112A to 112N when the memory system 110 is coupled with the host system 120 by the PCIe interface. The physical host interface can provide an interface for passing control, address, data, and other signals between the memory system 110 and the host system 120.

The memory devices 112A to 112N can include any combination of the different types of non-volatile memory devices and/or volatile memory devices. An example of non-volatile memory devices includes a negative-and (NAND) type flash memory. Each of the memory devices 112A to 112N can include one or more arrays of memory cells such as single level cells (SLCs) or multi-level cells (MLCs) (e.g., triple level cells (TLCs) or quad-level cells (QLCs)). In some implementations, a particular memory device can include both an SLC portion and a MLC portion of memory cells. Each of the memory cells can store bits of data (e.g., data blocks) used by the host system 120. Although non-volatile memory devices such as NAND type flash memory are described, the memory devices 112A to 112N can be based on any other type of memory such as a volatile memory. In some implementations, the memory devices 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. Furthermore, the memory cells of the memory devices 112A to 112N can be grouped as memory pages or data blocks that can refer to a unit of the memory device used to store data.

The controller 115 can communicate with the memory devices 112A to 112N to perform operations such as reading data, writing data, or erasing data at the memory devices 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory system 110, including handling communications between the memory system 110 and the host system 120. In some embodiments, the local memory 119 can include memory registers storing memory pointers, fetched data, etc. The local memory 119 can also include read-only memory (ROM) for storing micro-code. While the example memory system 110 in FIG. 1 has been illustrated as including the controller 115, in another embodiment of the present disclosure, a memory system 110 may not include a controller 115, and may instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the memory devices 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory devices 112A to 112N. The controller 115 can further include host interface circuitry to communicate with the host system 120 via the physical host interface. The host interface circuitry can convert the commands received from the host system into command instructions to access the memory devices 112A to 112N as well as convert responses associated with the memory devices 112A to 112N into information for the host system 120.

The memory system 110 can include a read look ahead optimizer 113 that can be used to determine a size of a read look ahead data that provides for an optimal pre-fetching of read look ahead data. For example, read look ahead optimizer 113 can identify a read request for data received from the host system 120 that are to be retrieved from the memory device 112A to 112N. As the read request from the host system 120 is received at the memory system, the read look ahead optimizer 113 can detect that the read request is associated with a pattern of data read requests. The read look ahead optimizer 113 can identify a transfer size associated with the read request from host system 120. The read look ahead optimizer 113 can determine a size of the data to retrieve (e.g., data for the read request, additional data to pre-fetch) in accordance with the detected pattern of read requests. The size of the data to retrieve can be based on the identified transfer size associated with the read request of the host system 120 and a transfer size associated with a die of memory device 112A to 112N. The read look ahead optimizer 113 can provide an indication to retrieve data at the determined size according to the detected pattern. Further details with regards to the operations of the read look ahead optimizer 113 are described below.

The memory system 110 can also include additional circuitry or components that are not illustrated. In some implementations, the memory system 110 can include a cache or buffer (e.g., DRAM) and address circuitry (e.g., a row decoder and a column decoder) that can receive an address from the controller 115 and decode the address to access the memory devices 112A to 112N.

Figure 2:
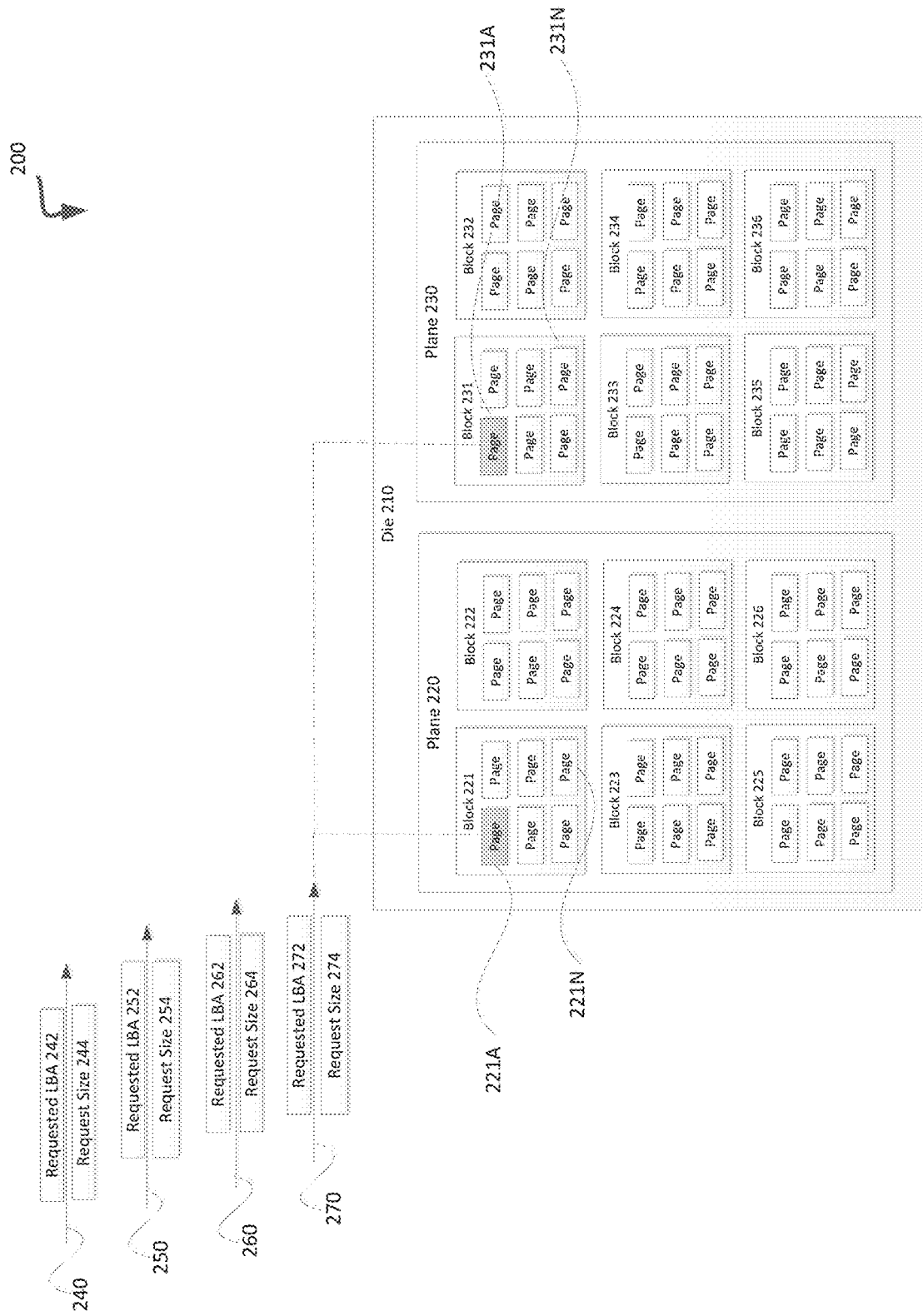
FIG. 2 illustrates an example arrangement of a memory die for which a size of read look ahead data is to be determined in accordance with some embodiments of the present disclosure.

FIG. 2 illustrates an example arrangement within a memory system 200 of a memory die for which a size of read look ahead data is to be determined, in accordance with some embodiments of the present disclosure. In general, the memory system 200 can correspond to the memory system 110 of FIG. 1. In some examples, the read look ahead optimizer 113, as described in FIG. 1, can perform the operations described in reference to FIG. 2.

In an implementation, the memory system receives a read request from a host system. The memory system can detect that the read request is associated with a pattern of read requests from the host system. For example, the controller can detect whether the host system has requested a certain number of read requests with sequential LBAs in a row. For example, as shown in FIG. 2, a read request 270 is received from the host system. It can be detected that read request 270 is associated with a pattern of read requests. The pattern of read requests can include multiple read requests for sequential LBAs. For example, the memory system can detect that read request 270 is part of a series of read requests 240, 250, 260 and 270 that included requests for sequential LBAs. Each of the read requests 240-270 can include a requested LBA and a request size. For example, read request 240 can include a request for a set of LBAs, where the starting LBA of the set is indicated by requested LBA 242 (e.g., a particular logical address that represents the first data block requested by the host system). Request size 244 indicates the size of data being requested in the set of LBAs. Request size 244 can be provided in number of LBAs (e.g., LBA count). The request size 244 can also be provided in a size of data (e.g., 8 kB), from which a number of LBAs can be calculated. That is, the host system can indicate the starting LBA of the set of LBAs and provide a request size to indicate how many LBAs to fetch in the set. Each of the following read requests 250, 260, and 270 can include requested LBA 252, 262, and 272, respectively, and be associated with request size 254, 264, and 274, respectively. A pattern can be considered sequential if the current LBA is equivalent to the previous LBA incremented by the previous transfer size. That is, for a read request 250, if the current LBA (e.g., requested LBA 252) of the read request 250 is equal to the previous LBA (e.g., requested LBA 242) of the preceding read request 240 plus the previous request size (e.g., request size 244) of the preceding read request 240, then the pattern of read requests can be considered sequential. In an implementation, the read look ahead does not need to wrap around LBAs.

A configurable read look ahead detection threshold can be set, where if the number of read requests with a sequential pattern reaches or exceeds the read look ahead detection threshold, then the memory system can trigger a read look ahead operation for the current read request to pre-fetch additional data according to the pattern, in addition to the data requested on the current read request. For example, the read look ahead detection threshold can be set to, but not be limited to, a value of 4. In that case, if four or more read requests in a row are detected to include requests for sequential LBAs, then a read look ahead operation can be triggered. A read look ahead count can keep track of the number of read requests with sequential LBAs. In FIG. 2, if four read requests 240, 250, 260, and 270 are detected to include sequential LBAs, then for read request 270, the memory system can fetch additional data according to the predicted sequential pattern in addition to the data requested by read request 270. The read look ahead detection threshold can be configured based on various factors, such as (but not limited to) type of host system, type of requests, historic data analysis, type of hardware in use, etc. The read look ahead detection threshold can be selected such that there is a good likelihood of the pattern being repeated on the next read request. In an implementation, a write request may not reset the read look ahead count.

The memory system can determine a size of data to retrieve for the current read request and the read look ahead operation. The data to retrieve can include a requested data based on the current read request, and a read look ahead data for anticipated subsequent read requests based on the detected pattern of the read requests. The size of the data to retrieve can be based on the transfer size of the read request and a transfer size associated with the die of a memory device from which to retrieve the data. The memory system can identify a transfer size associated with the current read request. In FIG. 2, read request 270 is depicted as the current read request. The memory system can identify the transfer size associated with the current read request 270 to be request size 274.

A transfer size associated with each die ("die-level transfer size") can be determined from the specification of the die. FIG. 2 illustrates an architecture of an example die 210 of a memory device (not shown) of memory system 200. The memory device can include multiple dies. A die is the smallest unit that can independently execute commands. A die can include one or more planes. Identical and concurrent operations can take place on each plane. Each plane can individually perform a different operation. As illustrated in FIG. 2, die 210 includes two planes, plane 220 and plane 230. Each plane can have multiple blocks. Blocks are the smallest units of data that can be erased. FIG. 2 shows that each plane of die 210 includes six blocks, blocks 221-226 for plane 220 and blocks 231-236 for plane 230. Each block can have multiple pages. Pages are the smallest units that can be written to. FIG. 2 shows multiple pages for each block of each plane. For example, block 221 includes pages 221A-221N. Each page can store up a certain amount of data. For example, the capacity of page 221A can be 16 kB of data. In an example, a memory device can include a die with 2 planes, 502 blocks per plane, 2304 pages per block, and each page can hold up to 16 kB of data. In another example, a memory device can include a die with 4 planes, 504 blocks per plane, 2304 pages per block, and each page can hold up to 16 kB of data. However, these values are for illustration purposes only and the disclosure is not limited to these values.

The die-level transfer size can be determined such that it provides for an optimal size of operation to be performed when using multi-plane operations. An optimal size of operation provides for, at the minimum, a size of transfers that needs to be performed so that at least one transfer of data operation (e.g., read operation) is performed on each plane of the die, achieving a multi-plane operation (e.g., a read operation on each plane). Every read request may be associated with a "time cost" or the time to read data (e.g., read time). Using a multi-plane operation can allow for increasing the amount of data available to transfer per time cost. If a single page holds 16 kB of data, reading a single page, 16 kB of data can be retrieved for one time cost. If more than one page of data can be read at the same time, then more data can be retrieved at the same time cost. For example, using multi-plane operations, reading 2 pages of data allows retrieving 32 kB of data for the same time cost, and reading 4 pages of data allows retrieving 64 kB of data for the same time cost.

In the example architecture of FIG. 2, the optimal size is achieved when at least one page of data is read from each plane at the same time. Given that there are 2 planes, a total of two page's worth of data from the two planes is to be transferred for achieving a multi-plane operation. Since each page can hold 16 kB of data in the example, the two page's worth of data would equal to 32 kB of data. In other words, 32 kB of data transfer would ensure a minimum amount of data sufficient for achieving a multi plane operation on the die. As such, the die-level transfer size for die 210 is 32 kB of data. It can be seen that a die-level transfer size can be determined based on the number of planes included on the die and a number of bytes that a page of each of the planes is capable of storing. For example, the two values can be multiplied to obtain the die-level transfer size. The formula can be expressed as:

"Die-level transfer size"="number of planes on the die"×"bytes per page."

In another example, a die can have 4 planes, with each page of the 4 planes having a capability to store 16 kB of data. In that example, the die-level transfer size is 64 kB, derived using the formula 4×16 kB. In yet another example, a die can have 6 planes, with each page of the 6 planes having a capability to store 32 kB of data. In that example, the die-level transfer size is 192 kB, derived using the formula 6×32 kB. As can be seen, the die-level transfer size is not limited to a certain value, and it can be derived from the particular specification of the die.

The read look ahead algorithm can set particular criteria for selecting an optimal size of read look ahead data to retrieve. For example, the size of the data can be based on the maximum value between the identified transfer size of the current request and the die-level transfer size associated with a die of the memory system. For example, assume that each LBA can hold 4 kB of data. That is, the size of a single LBA is 4 kB. In one example, the identified transfer size associated with the current read request 270, which is request size 274, may be 4 kB. Thus, request size 274 indicates that 1 LBA worth of data should be retrieved per the current request 270. For the die 210, as earlier described, the die-level transfer size is calculated to be 32 kB. With a 4 kB LBA size, 32 kB transfer size accommodates 8 LBAs, since 32 kB divided by 4 kB equals to 8. In determining the read look ahead data size, the memory system can compare the identified transfer size of 4 kB (or 1 LBA) of read request 270 and the die-level transfer size of 32 kB (or 8 LBAs). The memory system can select the higher value of the two for the read look ahead data size, which is the die-level transfer size of 32 kB (or 8 LBAs). The memory system can determine a total size of data to retrieve, which includes the size of data for the current read request (e.g., 4 kB or 1 LBA) and the size of data for the read look ahead data for subsequent requests (e.g., 32 kB or 8 LBAs). In total, the memory system can determine the total size of data to retrieve to be 36 kB (e.g., 4 kB+32 kb). An indication can be provided to the memory system to retrieve data in the amount of the determined total size (e.g., 36 kB). The additional data to be retrieved is to be in the detected sequential pattern.

In another example, assuming LBA size continues to be 4 kB, the identified transfer size (e.g., request size 274) of the current read request 270 can be 32 kB or 8 LBAs. For the die 210, as seen before, the die-level transfer size is calculated to be 32 kB or 8 LBA. In determining the read look ahead data size, the memory system can compare the identified transfer size of 32 kB (or 8 LBAs) of read request 270 and the die-level transfer size of 32 kB (or 8 LBAs). Since the values are same, the memory system can select the value 32 kB or 8 LBAs as the read look ahead data size. The total size of data to retrieve is the size of data for the current read request (e.g., 32 kB or 8 LBAs) and the size of data for the read look ahead data for subsequent requests (e.g., 32 kB or 8 LBAs). In total, the memory system can determine the total size of data to retrieve to be 64 kB (e.g., 32 kB+32 kb). An indication can be provided to the memory system to retrieve data in the amount of the determined total size (e.g., 64 kB).

In another example, assuming LBA size continues to be 4 kB, the identified transfer size (e.g., request size 274) of the current read request 270 can be 64 kB or 16 LBAs. For the die 210, as seen before, the die-level transfer size is calculated to be 32 kB or 8 LBAs. In determining the read look ahead data size, the memory system can compare the identified transfer size of 64 kB (or 16 LBAs) of read request 270 and the die-level transfer size of 32 kB (or 8 LBAs). The memory system can select the higher value of the two for the read look ahead data size, which is the currently requested transfer size of 64 kB (or 16 LBAs). At this size, the additional data can be read on two more die (32 kB per die) for the example die 210. The total size of data to retrieve is the size of data for the current read request (e.g., 64 kB or 16 LBAs) and the size of data for the read look ahead data for subsequent requests (e.g., 64 kB or 16 LBAs). In total, the memory system can determine the total size of data to retrieve to be 128 kB (e.g., 64 kB+64 kb). An indication can be provided to the memory system to retrieve data in the amount of the determined total size (e.g., 128 kB).

In some examples, the read look ahead data can be rounded up to a nearest transfer size of the die. For example, assuming that the LBA size continues to be 4 kB, the identified transfer size (e.g., request size 274) of the current read request 270 can be 60 kB or 15 LBAs. For the die 210, as seen before, the die-level transfer size is calculated to be 32 kB or 8 LBAs. In determining the read look ahead data size, the memory system can compare the identified transfer size of 60 kB (or 15 LBAs) of read request 270 and the die-level transfer size of 32 kB (or 8 LBAs). The memory system can select the higher value of the two for the read look ahead data size, which is the currently requested transfer size of 60 kB (or 15 LBAs). For a memory system having die specification similar to die 210, which is depicted as having two planes, the additional data of the size 60 kB can be retrieved on two additional die such that 32 kB of data is retrieved on one die (e.g., 16 kB per plane) and 28 kB of data is retrieved on another die (e.g., 16 kB on one plane, 12 kB on another plane). However, for maximizing efficiency, the memory system can round up the size of the read look ahead data so that 2 full die worth of data transfer can be performed. That is, the memory system can select the read look ahead data to be in the size of 64 kB, which is rounded up from 60 kB to the nearest transfer size of two full die. The total size of data to retrieve is the size of data for the current read request (e.g., 60 kB or 15 LBAs) and the size of data for the read look ahead data for subsequent requests (e.g., 64 kB or 16 LBAs). In total, the memory system can determine the total size of data to retrieve to be 124 kB (e.g., 60 kB+64 kb). An indication can be provided to the memory system to retrieve data in the amount of the determined total size (e.g., 124 kB).

For a die with a different die-level transfer size, the above calculations vary. A die with 4 planes can have a die-level transfer size of 4 full pages, which can be 64 kB if each page holds 16 kB data. In that case, for a current request size of 32 kB, the memory system can select the read look ahead data to be the higher size between requested transfer size of 32 kB and die-level transfer size of 64 kB, which is the die-level transfer size of 64 kB. Thus, a total of 96 kb of data is to be retrieved, based on 32 kB of current read request data and 64 kB of read look ahead data.

In some implementations, a maximum size can be set for the read look ahead data. The maximum size may be set because there may be a resource constraint based on the hardware of the memory system. Some implementations may allow only a certain amount of memory that can be dedicated for a read look ahead memory buffer. In such cases, once the read look ahead size reaches the maximum amount of data that the read look ahead buffer is capable of storing, the read look ahead size needs to be capped. For example, a read look ahead maximum size can be set to 128 LBAs (or 512 kB for 4 kB size LBAs). In such an example, even if the requested transfer size of the current read request is higher than 128 LBAs, the read look ahead size can be set to the maximum value of 128 LBAs for the memory system to pre-fetch.

Figure 3:
FIG. 3 is a flow diagram of an example method for determination of a read look ahead data size in accordance with some embodiments of the present disclosure.

FIG. 3 is a flow diagram of an example method 300 for determination of a read look ahead data size in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 can be performed by the read look ahead optimizer 113 of FIG. 1.

As shown in FIG. 3, at block 302, the processing logic can receive a read request from a host system. At block 304, the processing logic can detect that the read request is associated with a pattern of read requests. For example, the processing logic can detect that the read request is associated with multiple read requests for sequential logical block addresses (LBAs). Sequential LBAs can be detected if it is determined that a current LBA of each read request of the read requests is equal to a previous LBA of a preceding read request of the multiple read requests incremented by a previous transfer size (e.g., as number of LBAs) of the preceding read request. That is, it can be determined that the current LBA=previous LBA+previous transfer size.

At block 306, the processing logic can identify a requested transfer size associated with the read request. The requested transfer size can be provided as a number of LBAs (e.g., LBA count). It can also be provided in a size of data (e.g., 8 kB, etc.), from which a number of LBAs can be calculated.

At block 308, the processing logic can determine a size of data to retrieve based on the requested transfer size and a die-level transfer size associated with a die of a memory system. In an example, the data can include a requested data based on the read request and a read look ahead data for subsequent requests based on the pattern of read requests. The size of the data can be based on a larger size (e.g., value) between the requested transfer size and the die-level transfer size. The die-level transfer size can be determined by determining a number of planes included on the die and a number of bytes that a page of each of the planes is capable of storing. The two values can be multiplied to arrive at the die-level transfer size. The processing logic can further provide an indication for the memory system to retrieve the data in the amount of the determined size.

Figure 4:
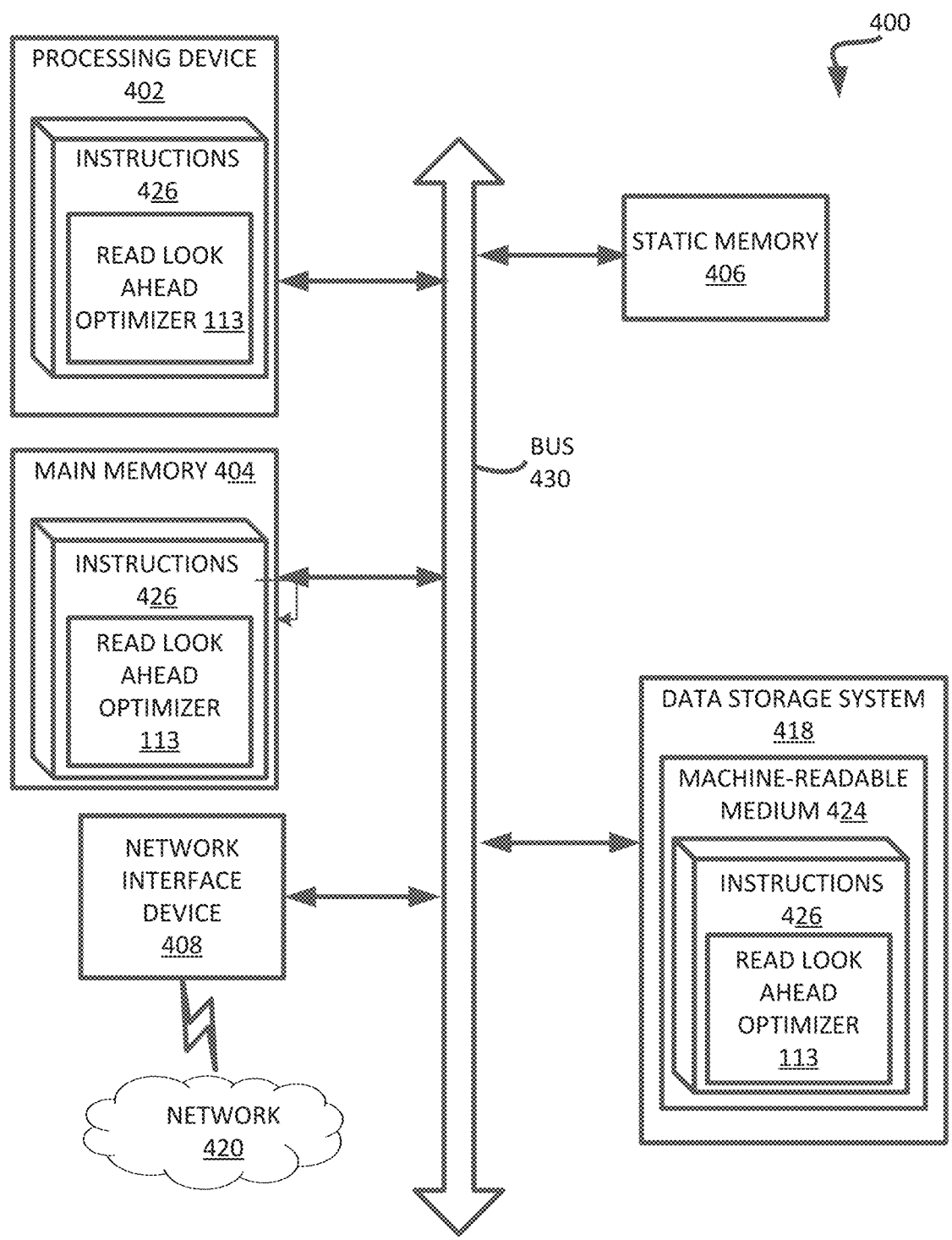
FIG. 4 is a block diagram of an example computer system in which implementations of the present disclosure can operate.

FIG. 4 illustrates an example machine of a computer system 400 within which a set of instructions, for causing the machine to perform any one or more of the methodologies discussed herein, can be executed. In some implementations, the computer system 400 can correspond to a host system (e.g., the host system 120 of FIG. 1) that includes or utilizes a memory system (e.g., the memory system 110 of FIG. 1) or can be used to perform the operations of a controller (e.g., to execute an operating system to perform operations corresponding to the read look ahead optimizer 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions or software 426 embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory system 110 of FIG. 1.

In one implementation, the instructions 426 include instructions to implement functionality corresponding to a read look ahead optimizer (e.g., read look ahead optimizer 113 of FIG. 1). While the machine-readable storage medium 424 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving a read request from a host system;
   detecting that the read request is associated with a pattern of read requests;
   identifying a requested transfer size associated with the read request;
   determining, by a processing device, a size of data to retrieve that corresponds to a multi-plane operation on a memory system in response to detecting that the read request is associated with the pattern of read requests, the size of the data being based on the requested transfer size and a die-level transfer size utilizing a total number of planes comprised on a die of the memory system; and
   providing an indication for the memory system to retrieve the data at the determined size.

2. The method of claim 1, wherein:
   the requested transfer size corresponds to an amount of data specified by the read request from the host system, and
   the die-level transfer size corresponds to another amount of data associated with an architecture of the die.

3. The method of claim 2, wherein the die-level transfer size is further based on a number of bytes that a page of each of the planes is capable of storing.

4. The method of claim 1, wherein the data comprises:
   a requested data based on the read request; and
   additional data for subsequent read requests based on the pattern of read requests.

5. The method of claim 1, wherein detecting that the read request is associated with the pattern of read requests comprises:
   detecting that the read request is associated with a plurality of read requests for sequential logical block addresses (LBAs).

6. The method of claim 1, wherein the size of the data is based on a larger size between the requested transfer size and the die-level transfer size.

7. A system comprising:
   a memory system;
   a processing device, operatively coupled with the memory system, to:
      receive a read request from a host system;
      detect that the read request is associated with a pattern of read requests;
      identify a requested transfer size associated with the read request;
      determine a size of data to retrieve that corresponds to a multi-plane operation on the memory system in response to detecting that the read request is associated with the pattern of read requests, the size of the data being based on the requested transfer size and a die-level transfer size utilizing a total number of planes comprised on a die of the memory system; and
      provide an indication for the memory system to retrieve the data at the determined size.

8. The system of claim 7, wherein:
   the requested transfer size corresponds to an amount of data specified by the read request from the host system, and
   the die-level transfer size corresponds to another amount of data associated with an architecture of the die.

9. The system of claim 8, wherein the die-level transfer size is further based on a number of bytes that a page of each of the planes is capable of storing.

10. The system of claim 7, wherein the data comprises:
    a requested data based on the read request; and
    additional data for subsequent read requests based on the pattern of read requests.

11. The system of claim 7, wherein to detect that the read request is associated with the pattern of read requests, the processing device is to:
    detect that the read request is associated with a plurality of read requests for sequential logical block addresses (LBAs).

12. The system of claim 7, wherein the size of the data is based on a larger size between the requested transfer size and the die-level transfer size.

13. A non-transitory computer-readable medium comprising instructions that, when executed by a processing device, cause the processing device to perform operations comprising:
    receiving a read request from a host system;
    detecting that the read request is associated with a pattern of read requests;
    identifying a requested transfer size associated with the read request;
    determining a size of data to retrieve that corresponds to a multi-plane operation on a memory system in response to detecting that the read request is associated with the pattern of read requests, the size of the data being based on the requested transfer size and a die-level transfer size utilizing a total number of planes comprised on a die of the memory system; and
    providing an indication for the memory system to retrieve the data at the determined size.

14. The non-transitory computer-readable medium of claim 13, wherein:
    the requested transfer size corresponds to an amount of data specified by the read request from the host system, and
    the die-level transfer size corresponds to another amount of data associated with an architecture of the die.

15. The non-transitory computer-readable medium of claim 14, wherein the die-level transfer size is further based on a number of bytes that a page of each of the planes is capable of storing.

16. The non-transitory computer-readable medium of claim 13, wherein detecting that the read request is associated with the pattern of read requests comprises:
    detecting that the read request is associated with a plurality of read requests for sequential logical block addresses (LBAs).

17. The non-transitory computer-readable medium of claim 13, wherein the size of the data is based on a larger size between the requested transfer size and the die-level transfer size.

18. The method of claim 1, wherein the multi-plane operation comprises:
    performing at least one transfer of data operation on each plane of the total number of planes comprised on the die.

19. The system of claim 7, wherein to perform the multi-plane operation, the processing device is to:
    perform at least one transfer of data operation on each plane of the total number of planes comprised on the die.

20. The non-transitory computer-readable medium of claim 13, wherein the multi-plane operation comprises:

performing at least one transfer of data operation on each plane of the total number of planes comprised on the die.

\* \* \* \* \*